US012515685B2

(12) United States Patent
Jäger et al.

(10) Patent No.: US 12,515,685 B2
(45) Date of Patent: Jan. 6, 2026

(54) METHOD FOR OPERATING A DRIVER ASSISTANCE SYSTEM INCLUDING BLOCKING VEHICLE START-UP AND ALTERING VEHICLE CONTROL

(71) Applicant: ZF Friedrichshafen AG, Friedrichshafen (DE)

(72) Inventors: Thomas Jäger, Meckenbeuren (DE); Bülent Sari, Friedrichshafen (DE); Hana Niederbrucker, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 185 days.

(21) Appl. No.: 17/889,076

(22) Filed: Aug. 16, 2022

(65) Prior Publication Data

US 2023/0053423 A1 Feb. 23, 2023

(30) Foreign Application Priority Data

Aug. 17, 2021 (DE) ...................... 10 2021 208 998.4

(51) Int. Cl.
*B60W 50/12* (2012.01)
*B60W 10/04* (2006.01)

(52) U.S. Cl.
CPC ............ *B60W 50/12* (2013.01); *B60W 10/04* (2013.01)

(58) Field of Classification Search
CPC ............................... B60W 10/04; B60W 50/12
See application file for complete search history.

(56) References Cited

U.S. PATENT DOCUMENTS

| | | | |
|---|---|---|---|
| 6,601,669 B1 * | 8/2003 | Agnew | B60K 28/10 180/170 |
| 9,688,247 B1 * | 6/2017 | Jayaraman | H04L 9/32 |
| 2014/0172263 A1 * | 6/2014 | Agnew | B60T 17/18 701/78 |
| 2018/0204462 A1 * | 7/2018 | Tomescu | G06V 20/58 |
| 2019/0291728 A1 * | 9/2019 | Shalev-Shwartz | B60W 30/0953 |
| 2020/0298798 A1 * | 9/2020 | Yamamoto | G08B 25/10 |
| 2020/0369239 A1 * | 11/2020 | Mueller | B60R 25/30 |
| 2021/0287546 A1 * | 9/2021 | Englander | G08G 1/166 |

FOREIGN PATENT DOCUMENTS

| | | |
|---|---|---|
| DE | 10 2010 025 897 A1 | 1/2012 |
| DE | 10 2011 011 221 A1 | 7/2012 |
| DE | 11 2011 105 189 T5 | 1/2014 |
| DE | 10 2015 208 366 A1 | 11/2016 |
| DE | 10 2015 221 607 A1 | 5/2017 |
| DE | 10 2019 103 627 A1 | 8/2020 |

* cited by examiner

*Primary Examiner* — Jess Whittington
(74) *Attorney, Agent, or Firm* — Crowell & Moring LLP

(57) ABSTRACT

A method for operating a vehicle includes detecting a road user in a predetermined portion of a vehicle's environment, detecting a start-up attempt by vehicle driver, blocking a vehicle start-up in response to the detection of a road user in the vehicle's environment and to the detected start-up attempt, and altering a vehicle control such that the comfort of the driver is reduced in comparison with an unaltered vehicle control when the vehicle start-up has been blocked.

17 Claims, 2 Drawing Sheets

METHOD FOR OPERATING A DRIVER ASSISTANCE SYSTEM INCLUDING BLOCKING VEHICLE START-UP AND ALTERING VEHICLE CONTROL

CROSS-REFERENCE TO RELATED APPLICATION

This application claims priority from German Application No. DE 10 2021 208 998.4, filed on Aug. 17, 2021, the entirety of which is hereby fully incorporated by reference herein.

TECHNICAL FIELD

The present invention relates to a method for operating a vehicle with a driver assistance system. The invention also relates to a driver assistance system for a vehicle.

BACKGROUND

DE 10 2015 221 607 A1 describes a driver assistance system with which the alertness of the driver is monitored and an autonomous driving of the motor vehicle is initiated after determining a driver's alertness in certain driving situations.

A method for identifying the alertness of a driver in a motor vehicle is described in DE 10 2011 011 221 A1.

SUMMARY

A first aspect of the invention relates to a method for operating a vehicle with a driver assistance system. The vehicle can be a motor vehicle. A motor vehicle can be a passenger automobile or a truck.

The driver assistance system can help a driver control the vehicle, e.g. to avoid collisions The driver assistance system can have sensors and a control unit for this. The driver assistance system can be configured to prevent the vehicle from driving off in response to a detected road user. The driver assistance system can determine in advance whether this driving off would result in a collision with the detected road user for this.

The method contains a step for detecting a road user in a predetermined portion of the vehicle's environment by the driver assistance system. The road user can be an obstacle, such as another vehicle or a vulnerable road user, such as a bicyclist or pedestrian. It can be detected by a detection device in the driver assistance system, which can contain the aforementioned sensors. By way of example, the detection can take place with a camera, radar, or ultrasonic transducer. The portion of the environment can border on the vehicle, for example. The portion of the environment can be determined such that a collision might occur with the road user therein when driving into it. The portion of the environment can be an area in front and/or to the side of the vehicle, e.g. up to a maximum distance. The portion of the environment can also correspond to a detection range of the sensors for detecting road users. The portion of the environment can be predefined on a permanent basis, or it can be defined on the basis of a vehicle steering angle.

The method contains a step for detecting a start-up attempt by the driver. The driver assistance system can contain a detection device configured to detect this. A start-up can comprise a driving off of the vehicle from a standstill or nearly a standstill. The start-up attempt can comprise a control of the vehicle by the driver that would result in the start-up of the vehicle if it is not blocked. By way of example, this can comprise a release of the brakes, shifting to a driving mode, and/or actuation of the gas pedal. It may also be necessary for the vehicle motor to be on.

The method contains a step for blocking the vehicle start-up by the driver assistance system in response to detecting a road user in the portion of the environment and to a start-up attempt by a driver. This blocking can prevent a collision with the detected road user. The blocking can only take place, for example, when there is the danger of colliding with the road user if the vehicle starts up. The blocking can prevent the start-up. The driver assistance system can actuate the brakes in the vehicle for this blocking. Alternatively or additionally, the driver assistance system can also intervene in the drive control to achieve the blocking.

The method contains a step for altering a vehicle control such that the comfort in driving the vehicle is reduced for the driver if the vehicle start-up has been blocked in comparison to when the vehicle control is not altered. The comfort can relate to the difficulty in controlling the vehicle. The comfort can also relate to the convenience of staying in the vehicle, e.g. with regard to driving tranquility or the vibrations of a driver's seat. The change in the vehicle control can be affected by the driver assistance system, e.g. through a signal to the vehicle control system. The use of the vehicle can comprise a start-up with the vehicle, or remaining in the vehicle. The vehicle control can be altered such that the comfort is only altered in the physical or temporal context of a start-up and/or a start-up attempt. A reduced comfort can require additional control commands for the start-up in comparison with an unaltered vehicle control, and/or modifying a vehicle's start-up behavior in comparison with the unaltered vehicle control. The vehicle control can relate to control of the vehicle drive train. The vehicle control can comprise control parameters for the vehicle that define a response to control commands from a driver. The vehicle control can also relate to the control of other systems and devices in the vehicle, e.g. a seatbelt tensioner.

The method is based on analyses of the functional safety of driver assistance systems that can block a vehicle start-up. One error that can be anticipated is an intentional misuse of the vehicle by the driver when starting off with such systems. The driver may become accustomed to the driver assistance system preventing a collision and first allowing the vehicle to start off when the danger of a collision has been eliminated. This may be the case, for example, when the other road user has left the portion of the environment in question. In this regard, the driver may find it more convenient to simply press on the gas pedal without ensuring that the area in front of the vehicle does not contain any other road users, or simply press down on the gas pedal until the collision potential has been eliminated and the driver assistance system automatically allows the starting off. Such a behavior is undesirable, however, because the driver assistance system is only intended as an aid for the driver, and the actual responsibility lies with the driver. Probability of an accident increases as soon as the driver's role in controlling the vehicle is no longer acknowledged.

Because the vehicle control is altered after intervention such that the use thereof is less comfortable for the driver than when the vehicle control is not altered, such a behavior is prevented. The driver would attempt to avoid interventions by the driver assistance system in order to maintain the comfort in using the vehicle. This keeps the driver more alert and responsible. This can reduce instances of driver assistance system misuse.

The method can contain a step for notifying the driver of a change in the vehicle control. This can increase acceptance. In this manner, it is possible to prevent the driver from attributing a reduction in the comfort to a vehicle error instead of to the start-up attempt and the resulting necessary blocking. The driver assistance system can be configured to issue an audio and/or visual notification.

The driver assistance system can be configured to first warn or inform the driver if a road user has been detected in the environment that would lead to a blocking of a start-up attempt. The driver assistance system then only intervenes by blocking the start-up if an actual start-up attempt is made.

In one embodiment the method also contains a step in which the blocking is rescinded if it has been detected that the road user has left the portion of the vehicle's environment in question. This rescinding of the blocking then allows the vehicle to start off. By way of example, the brakes can be released. The blocking can be rescinded, for example, when the danger of a collision no longer exists. The exiting of the portion of the environment by the road user can be detected by a sensor, for example. Alternatively, the exiting of the portion of the environment by the road user can be detected in that the road user previously detected in the environment is no longer detected.

In one embodiment of the method, the change in vehicle control comfort requires that the driver must first shift to a driving stage again before attempting to start off. A driving stage can be a gear in which tractive force can be transferred to the wheels of the vehicle. A driving stage can be reverse or drive settings. This may require that a gearshift lever be actuated by the driver. It may be necessary to shift to this setting again because a driving stage may have already been shifted to prior to blocking the start-up attempt, and this setting can be another driving stage or the same driving stage. The driver must therefore shift to a driving stage for the vehicle in order to rescind the blocking of the start-up. This is inconvenient for the driver in that it requires an additional activity in order to start off due to the blocking and the resulting change in the vehicle control. The driver would naturally attempt to avoid this. The method can contain a step in which the vehicle must be shifted to neutral after a start-up has been blocked. The neutral stage can be a gear setting in which no tractive force can be transferred to the wheels of the vehicle. The driver then only has to shift from neutral to drive. Alternatively, it may also be necessary to shift manually to neutral and then to drive. The start-up attempt can be blocked permanently, and require a specific action by the driver, e.g. shifting to drive, in order to rescind the blocking. Shifting to the driving stage can be intuitive for starting off, and easy for the driver to realize. This eliminates the problem of the driver not being able to realize how to overcome or rescind the blocking.

In one embodiment of the method, the change in vehicle control requires that the driver must first release the gas pedal in order to attempt the start-up again. Releasing the gas pedal can comprise stopping pushing down on or otherwise actuating the gas pedal. It is then only possible to attempt the start-up again by pressing down on the gas pedal. Pressing down on the gas pedal can initiate application of a tractive force by the drive train. Continued pressing on the gas pedal after intervention by the driver assistance system is the most common form of misuse. The method can therefore potentially result in a didactive effect with which the driver is taught that a continued pressing on the gas pedal despite the driver assistance system intervention does not result in the vehicle starting off.

In one embodiment of the invention the change in the vehicle control involves a change in the start-up behavior of the vehicle in comparison to when the vehicle control has not been altered. The start-up behavior can be a maximum acceleration, a response to control commands from the driver, or a behavior of the drive train when starting off. By changing the start-up behavior, the driver can easily recognize that there is a connection between the reduced comfort and the necessary blocking of the start-up.

In one embodiment of the method, the change in the start-up behavior of the vehicle results in a slower buildup of a propulsion torque in the vehicle than when the vehicle control has not been altered. In particular, an electric drive in a purely electric vehicle, or a vehicle with a hybrid drive can be ideal for this. The slowed buildup of the propulsion torque in the vehicle can then be the result of a slowed torque buildup by the electric motor in the electric drive.

In one embodiment of the method, the change in the start-up behavior of the vehicle involves an engaging of the start-up clutch when starting off requiring more time than with unaltered vehicle control. By way of example, it may take twice as long to fully engage the start-up clutch than with an unaltered vehicle control. By changing the start-up behavior of the vehicle, the engagement of the start-up clutch may be slower than with the unaltered vehicle control. The start-up clutch may enable or facilitate an alignment of the rotational rate of the wheels on the vehicle to an output drive of a vehicle motor when starting off. The engagement can enable a torque to be transferred at the start-up clutch.

In one embodiment of the method, the change in the start-up behavior of the vehicle involves an oscillating engagement of a start-up clutch when starting off. This oscillating engagement cannot take place when the vehicle control is unaltered. An oscillating engagement can indicate, for example, that the clutch intermittently disengages, at least partially, for a certain amount of time, or until reaching a minimum driving speed. This can result in bucking when starting off, which may be uncomfortable for the driver. Alternatively or additionally, it may be impossible to apply the full drive power, for example, or the drive force may oscillate, which is likewise uncomfortable for the driver.

In one embodiment, the method also contains a step for issuing a warning signal in response to the blocking. The warning signal can be audio and/or visual. The warning signal can be issued in a display and/or from a speaker. The driver assistance system can be configured to issue the warning signal. The driver assistance system can contain an output system for this. The warning signal can be issued, for example, as soon as a start-up is blocked. This indicates to the driver that the driver assistance system has intervened.

The change in the vehicle control can only take place if the driver does not stop attempting to start off in response to the warning signal. As a result, the vehicle control can only be altered if the driver actually attempts to misuse the driver assistance system. Consequently, comfort is only reduced in the case of improper use behavior by the driver. To avoid a change in the vehicle control, the start-up attempt must be stopped within a predefined time period after the warning signal has been issued. A stopping of the start-up attempt can be a change in vehicle control by the driver resulting in no longer attempting to start off, if this is not already blocked by the driver assistance system. Stopping the start-up attempt can involve releasing the gas pedal, for example.

In one embodiment of the method, the change in vehicle control involves activation of the vehicle drive train, wherein the activation of the drive train results in a bucking of the vehicle. This can take place until the driver stops attempting to start off. The bucking can indicate to the driver that the blocking was necessary. This can also reduce the comfort for the driver, since a bucking vehicle can be perceived as uncomfortable. The bucking can take place while the vehicle is at a standstill, or at least not moving noticeably. The bucking can be caused by an oscillating clutch actuation. Alternatively or additionally, a motor can generate a torque pulse that can be very short. This torque pulse can be noticeable for the driver, and likewise result in bucking. In particular, an electric drive in a purely electric vehicle or a vehicle with a hybrid drive may be ideal for this. The activation of the drive train resulting in the bucking of the vehicle can involve an oscillating clutch actuation and/or an activation of the motor to generate torque pulses.

In one embodiment of the method, the change in vehicle control involves activation of a seatbelt tensioner. The activation of the seatbelt tensioner can result in the seatbelt on the driver being pulled tight. There is normally already a seatbelt tensioner in vehicles for safety reasons, such that this requires no installation of an additional system. The activation of the seatbelt tensioner can take place, for example, until the driver stops attempting to start off. The seatbelt tensioner can indicate to the driver that the blocking was necessary. This can also reduce the comfort for the driver, because a tighter seatbelt can be regarded as uncomfortable.

In one embodiment of the method, the change in vehicle control only occurs if the blocking of the start-up exceeds a predefined frequency. This prevents a reduction in comfort if the driver has not made an operating error in order to misuse the driver assistance system, but instead has actually mistakenly overlooked a pending collision when attempting to start off. The frequency can be an absolute number of blockings. The frequency can also be a number of blockings within a specific time frame. The frequency can be a portion of blockings in all start-up attempts, or start-up attempts within a time frame. The change in vehicle control therefore only occurs with repeated blocking of the start-up, e.g. when the portion of blockings in a specific number of start-up attempts exceeds a threshold value.

In one embodiment, the method contains a step for reinstating the unaltered vehicle control if the start-up attempts that are not blocked exceed a predefined frequency. This can ensure that an original comfort in using the vehicle is reinstated if the driver no longer attempts to misuse the driver assistance system. By way of example, the unaltered vehicle control can be reinstated if the portion of blockings in a specific number of start-up attempts falls below a threshold value. By way of example, a minimum number of start-up attempts, or start-up attempts without intervention by the driver assistance system, may be necessary for the original vehicle control to be reinstated.

A second aspect of the invention relates to a driver assistance system. The driver assistance system can be configured to execute some or all of the steps in the method according to the first aspect. Other features, embodiments and advantages can be derived from the description of the first aspect of the invention.

The driver assistance system contains a detection device that is configured to detect a road user in a predetermined portion of a vehicle's environment. The detection device can contain sensors, such as a camera, for this.

The driver assistance system has a detection device that is configured to detect a start-up attempt with the vehicle by the driver. The detection device can have sensors for this that detect actuation of a brake pedal and gas pedal. The detection device can also be configured to detect an engaged drive stage and/or a vehicle motor state.

The driver assistance system contains a blocking device that is configured to block the vehicle from starting off in response to the detection of a road user in the vehicle's environment and to the detected start-up attempt. The blocking device can be configured, for example, to actuate the vehicle brakes for the purpose of the blocking.

The driver assistance system contains a control unit that is configured to alter vehicle control such that the comfort of the driver of the vehicle is reduced in comparison to when the vehicle control is unaltered, if the vehicle start-up has already been blocked. The control unit can be configured to send control signals to a drive train in the vehicle for this. The control unit can also be configured to send control signals to a brake system in the vehicle for this. The control unit can also be configured to alter the parameters in a control unit for the vehicle.

DETAILED DESCRIPTION

Figure 1:
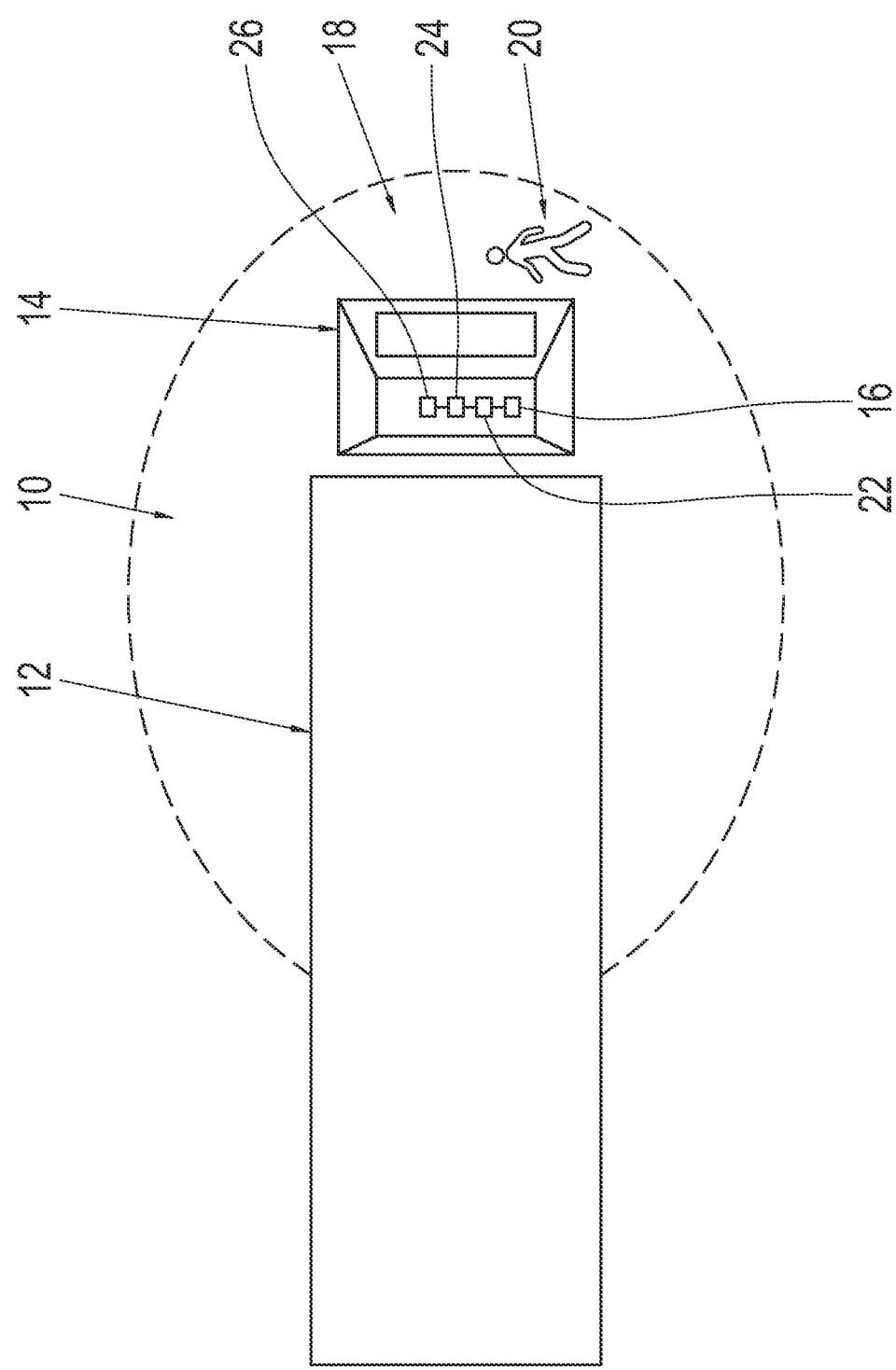
FIG. 1 shows a schematic top view of a vehicle with a driver assistance system.

FIG. 1 illustrates a vehicle 10 in the form of a truck, in a schematic top view. The vehicle 10 comprises a trailer 12 and a tractor 14.

The vehicle 10 also has a driver assistance system. The driver assistance system contains a detection device 16 that is configured to detect a road user in a predetermined portion of the vehicle's 10 environment 18. The portion of the environment 18 is indicated by a broken line in FIG. 1. There is also a road user in the form of a pedestrian 20 in the drawing. The pedestrian 20 is so close to the tractor 14 that a driver in the tractor 14 would be unable to see the pedestrian 20. The detection device 16 nevertheless detects the pedestrian 20 in the vehicle's environment 18.

The driver assistance system also has a detection device 22 that is configured to detect a start-up attempt by the driver in the vehicle 10. The driver assistance system also contains a blocking device 24 that is configured to block a vehicle start-up 10 in response to the detection of the road user in the vehicle's environment 18, and to the detected start-up attempt. As a result, a collision with the pedestrian 20 can be prevented, even though the driver cannot see the pedestrian 20. This increases the safety for these vulnerable road users.

Figure 2:
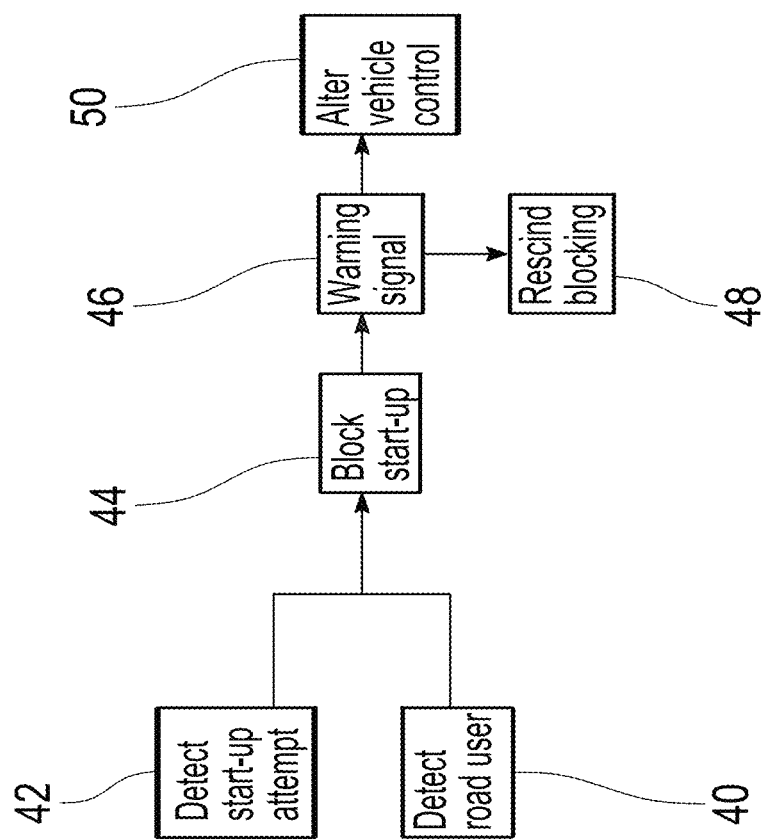
FIG. 2 schematically illustrates a method for operating the vehicle shown in FIG. 1.

FIG. 2 shows a schematic illustration of a method for operating the vehicle 10, which prevents the driver 10 from relying only on the driver assistance system when starting up to avoid a collision such that the driver does not personally check the vehicle's environment 18. At least some of the road users in the vehicle's environment could be detected by the driver, such that no attempts should be made to start off without the driver first checking those areas that within the driver's viewing range.

The road user is detected in step 40 in the predefined portion of the vehicle's 10 environment 18 by means of the detection device 16. The start-up attempt by the driver in the vehicle 10 is detected in step 421 by means of the detection device 22. The vehicle start-up is blocked by the blocking device 24 in step 44 in response to the detection of the road user in the vehicle's environment 18 and in response to the detected start-up attempt. A warning signal is issued to the driver in step 46 that indicates that the start-up attempt has been blocked.

If the driver stops the start-up attempt within a predetermined time frame after the warning signal has been issued, the method then continues at step 48. The blocking of the start-up is rescinded in step 48, when it has been detected that the road user has left the portion of the vehicle's 10 environment 18. This means that there is no longer any danger of a collision. The driver can then drive the vehicle 10 as usual.

When the driver does not stop attempting to start off within the predetermined time frame after the warning signal has been issued, the method continues at step 50. The vehicle control is altered in step 50, such that the comfort of the vehicle 10 for the driver is reduced in comparison with an unaltered vehicle control. Activation of the driver train in the vehicle is then altered until the start-up attempt has been stopped such that the vehicle 10 bucks, as part of the change in the vehicle control. The driver must also shift again to a driving stage, and the gas pedal must first be released, prior to attempting again to start up. With the next start-up attempt, the start-up behavior is also altered by the altered vehicle control, such that the vehicle can only accelerate to a limited extent. The driver assistance system has a control unit 26 for this that is configured to alter a vehicle control accordingly.

The driver will attempt to prevent this change in the vehicle control. For this reason, the driver will first check the vehicle's 10 environment 18 prior to attempting to start off, in order to prevent intervention by the driver assistance system. In this manner, the driver attempts to prevent endangering other road users with a start-up attempt, independently of the driver assistance system.

REFERENCE SYMBOLS

- 10 vehicle
- 12 trailer
- 14 tractor
- 16 detection device
- 18 portion of the environment
- 20 pedestrian/road user/obstacle
- 22 detection device
- 24 blocking device
- 26 control unit
- 40 detecting the road user
- 42 detecting the start-up attempt
- 44 blocking the starting off
- 46 warning signal to the driver
- 48 rescinding of the blocking
- 50 altering the vehicle control

The invention claimed is:

1. A method for operating a vehicle with a driver assistance system, the method comprising:
    detecting a road user in a predetermined environment of the vehicle by the driver assistance system;
    detecting a start-up attempt by the driver of the vehicle;
    blocking a vehicle start-up by the driver assistance system in response to the detection of a road user in the predetermined environment and to the detected start-up attempt;
    determining that a frequency of start-up blockings in prior vehicle start-up attempts exceeds a first threshold value;
    altering a vehicle control other than blocking the vehicle start-up such that comfort for the driver of the vehicle is reduced in comparison with an unaltered vehicle control in response to determining that the frequency of start-up blockings in prior vehicle start-up attempts exceeds the threshold value;
    determining that a frequency of start-up attempts that are not blocked exceeds a second threshold value; and
    reinstating unaltered vehicle control in response to determining that the frequency of start-up attempts that are not blocked exceeds the second threshold value.

2. The method according to claim 1, comprising:
    rescinding the blocking in response to detecting that the road user has left the predetermined environment.

3. The method according to claim 1, wherein the altering the vehicle control comprises requiring the driver to reengage a driving stage in the vehicle in order to attempt the start-up again.

4. The method according to claim 1, wherein the altering the vehicle control comprises requiring the driver to first release a gas pedal before attempting the start-up again.

5. The method according to claim 1, wherein the altering the vehicle control comprises a change in a start-up behavior of the vehicle in comparison with an unaltered vehicle control.

6. The method according to claim 5, wherein the change in the start-up behavior of the vehicle comprises a slowed buildup of a propulsion torque in the vehicle in comparison with the unaltered vehicle control.

7. The method according to claim 6, wherein the change in the start-up behavior of the vehicle comprises a slower engaging of a start-up clutch when starting off than with the unaltered vehicle control.

8. The method according to claim 5, wherein the change in the start-up behavior of the vehicle comprises an oscillating buildup of a propulsion torque in the vehicle.

9. The method according to claim 8, wherein the oscillating buildup of the propulsion torque in the vehicle comprises an oscillating engagement of a start-up clutch when starting off and/or an activation of the vehicle motor that generates torque pulses.

10. The method according to claim 1, comprising:
    issuing a warning signal in response to the blocking,
    wherein the altering the vehicle control occurs in response to the start-up attempt being maintained by the driver after issuing the warning signal.

11. The method according to claim 1, wherein the altering the vehicle control comprises an activation of a drive train in the vehicle to induce a bucking of the vehicle.

12. The method according to claim 1, wherein the altering the vehicle control comprises an activation of a seatbelt tensioner in the vehicle.

13. The method according to claim 1, comprising:
    notifying the driver of the altering of the vehicle control.

14. The method according to claim 1,
    wherein the predetermined environment of the vehicle is dependent upon a current steering angle of the vehicle.

15. The method according to claim 1,
    wherein the altering the vehicle control comprises requiring the driver to perform additional control commands for the start-up in comparison with the unaltered vehicle control.

16. The method according to claim 1,
    wherein the frequency of start-up blockings in prior vehicle start-up attempts includes at least one of:
    an absolute number of start-up blockings in prior vehicle start-up attempts,
    a number of start-up blockings in prior vehicle start-up attempts within a specified time frame, or a portion of start-up blockings in prior start-up attempts within the specified time frame or within a specified number of prior start-up attempts.

17. A driver assistance system for a vehicle comprising:
a detection device comprising at least one sensor configured to detect a road user in a predetermined portion of a vehicle's environment; and
at least one controller configured to:
   detect a start-up attempt by the vehicle driver;
   block a vehicle start-up in response to the detection of the road user in predetermined portion of the vehicle's environment and to the detected start-up attempt;
   determine that a frequency of start-up blockings in prior vehicle start-up attempts exceeds a first threshold value;
   alter a vehicle control in a manner other than blocking the vehicle start-up such that comfort for the driver of the vehicle is reduced in comparison with an unaltered vehicle control in response to determining that the frequency of start-up blockings in prior vehicle start-up attempts exceeds the threshold value;
   determine that a frequency of start-up attempts that are not blocked exceeds a second threshold value; and
   reinstate unaltered vehicle control in response to determining that the frequency of start-up attempts that are not blocked exceeds the second threshold value.

* * * * *